United States Patent
Avudaiyappan et al.

(10) Patent No.: US 10,402,322 B2
(45) Date of Patent: *Sep. 3, 2019

(54) SYSTEMS AND METHODS FOR FASTER READ AFTER WRITE FORWARDING USING A VIRTUAL ADDRESS

(71) Applicant: Intel Corporation, Santa Clara, CA (US)

(72) Inventors: Karthikeyan Avudaiyappan, Sunnyvale, CA (US); Paul Chan, Oakland, CA (US)

(73) Assignee: Intel Corporation, Santa Clara, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 15/686,721

(22) Filed: Aug. 25, 2017

(65) Prior Publication Data

US 2018/0046575 A1 Feb. 15, 2018

Related U.S. Application Data

(63) Continuation of application No. 14/819,255, filed on Aug. 5, 2015, now Pat. No. 9,767,020, which is a continuation of application No. 14/015,086, filed on Aug. 30, 2013, now Pat. No. 9,361,227.

(51) Int. Cl.
*G06F 12/02* (2006.01)
*G06F 12/08* (2016.01)
*G06F 12/10* (2016.01)
*G06F 9/38* (2018.01)
(Continued)

(52) U.S. Cl.
CPC ............ *G06F 12/08* (2013.01); *G06F 9/3824* (2013.01); *G06F 9/3826* (2013.01); *G06F 9/3834* (2013.01); *G06F 9/3861* (2013.01); *G06F 12/0802* (2013.01); *G06F 12/10* (2013.01); *G06F 12/1045* (2013.01); *G06F 12/1063* (2013.01); *G06F 2212/1016* (2013.01); *G06F 2212/654* (2013.01)

(58) Field of Classification Search
CPC .. G06F 9/3824; G06F 9/3826; G06F 12/0292; G06F 12/1027; G06F 12/1045
See application file for complete search history.

(56) References Cited

U.S. PATENT DOCUMENTS

| 4,847,758 A | 7/1989 | Olson et al. |
| 4,858,111 A | 8/1989 | Steps |
| 5,301,287 A | 4/1994 | Herrell et al. |

(Continued)

OTHER PUBLICATIONS

Final Office Action from U.S. Appl. No. 14/819,255, dated Feb. 10, 2017, 10 pages.

(Continued)

*Primary Examiner* — Hal Schnee
(74) *Attorney, Agent, or Firm* — NDWE LLP

(57) ABSTRACT

Methods for read after write forwarding using a virtual address are disclosed. A method includes determining when a virtual address has been remapped from corresponding to a first physical address to a second physical address and determining if all stores occupying a store queue before the remapping have been retired from the store queue. Loads that are younger than the stores that occupied the store queue before the remapping are prevented from being dispatched and executed until the stores that occupied the store queue before the remapping have left the store queue and become globally visible.

19 Claims, 8 Drawing Sheets

(51) Int. Cl.
*G06F 12/0802* (2016.01)
*G06F 12/1045* (2016.01)

(56) References Cited

U.S. PATENT DOCUMENTS

| | | | |
|---|---|---|---|
| 5,513,344 | A | 4/1996 | Nakamura |
| 5,603,010 | A | 2/1997 | Dodd et al. |
| 5,983,332 | A | 11/1999 | Watkins |
| 6,021,485 | A | 2/2000 | Feiste et al. |
| 6,141,747 | A | 10/2000 | Witt |
| 6,215,497 | B1 | 4/2001 | Leung |
| 6,366,984 | B1 | 4/2002 | Carmean et al. |
| 6,401,192 | B1 | 6/2002 | Schroter et al. |
| 6,457,075 | B1 | 9/2002 | Koutsoures |
| 6,505,277 | B1 | 1/2003 | Arimilli et al. |
| 7,177,985 | B1 | 2/2007 | Diefendorff |
| 7,334,108 | B1 | 2/2008 | Case et al. |
| 7,343,477 | B1 | 3/2008 | Thatipelli et al. |
| 7,594,079 | B2 | 9/2009 | Yu et al. |
| 2001/0013870 | A1 | 8/2001 | Pentkovski et al. |
| 2003/0005226 | A1 | 1/2003 | Hong |
| 2003/0018875 | A1 | 1/2003 | Henry et al. |
| 2006/0031641 | A1 | 2/2006 | Hataida et al. |
| 2006/0179284 | A1 | 8/2006 | Jensen et al. |
| 2007/0288725 | A1 | 12/2007 | Luick |
| 2009/0089510 | A1 | 4/2009 | Lee et al. |
| 2009/0150622 | A1 | 6/2009 | Allen, Jr. et al. |
| 2010/0011166 | A1 | 1/2010 | Yu et al. |
| 2010/0049952 | A1 | 2/2010 | Eddy et al. |
| 2011/0040955 | A1 | 2/2011 | Hooker et al. |
| 2011/0145513 | A1 | 6/2011 | Iyer et al. |
| 2012/0072667 | A1 | 3/2012 | Anderson et al. |
| 2014/0013027 | A1 | 1/2014 | Jannyavula et al. |
| 2014/0095784 | A1 | 4/2014 | Tran et al. |
| 2014/0173343 | A1 | 6/2014 | Ahmed et al. |
| 2014/0205012 | A1 | 7/2014 | Lee et al. |
| 2014/0317357 | A1 | 10/2014 | Kaplan et al. |

OTHER PUBLICATIONS

Non-Final Office Action from U.S. Appl. No. 14/819,255, dated Sep. 23, 2016, 10 pages.
Notice of Allowance from U.S. Appl. No. 14/015,086, dated Feb. 11, 2016, 15 pages.
Notice of Allowance from U.S. Appl. No. 14/015,086, dated May 6, 2015, 13 pages.
Notice of Allowance from U.S. Appl. No. 14/015,086, dated Sep. 2, 2015, 11 pages.
Notice of Allowance from U.S. Appl. No. 14/819,255, dated May 22, 2017, 14 pages.

SYSTEMS AND METHODS FOR FASTER READ AFTER WRITE FORWARDING USING A VIRTUAL ADDRESS

RELATED APPLICATIONS

The present application is a continuation of U.S. patent application Ser. No. 14/819,255, filed Aug. 5, 2015, which application is a continuation-in-part of U.S. patent application Ser. No. 14/015,086, filed Aug. 30, 2013, entitled "SYSTEM AND METHODS FOR FASTER READ AFTER WRITE FORWARDING USING A VIRTUAL ADDRESS," naming Karthikeyan Avudaiyappan and Paul Chan as inventors, both of which are incorporated herein by reference in their entirety.

A cache in a central processing unit is a data storage structure that is used by the central processing unit of a computer to reduce the average time that it takes to access memory. It is a data storage structure which stores copies of data that are located in the most frequently used main memory locations. Moreover, a cache is a data storage structure that is smaller and that may be accessed more quickly than main memory.

Conventional caches can include separate cache components that have a hierarchical relationship. For example, conventional cache systems can include level 1, level 2 and level 3 cache structures. Such cache structures are accessed by means of instructions called loads and stores.

A load instruction fetches data from a physical address and places the data into a register. The load instruction carries with it a virtual address that has to be translated to a physical address before data can be fetched and supplied to the load. A load instruction can obtain its data from multiple sources, such as, caches, main memory and prior stores (prior stores present in a store queue). Consider the following programming sequence:

STORE [A]
LOAD [A]

Moreover, consider the condition that when LOAD [A] is dispatched, prior store, STORE [A], is still present in a store queue. Hence, the load must obtain its data (e.g., [A]) from the store queue. To obtain data from STORE [A], which as indicated is present in the store queue, the load has to compare its physical address to all the entries in the store queue. If there is an address match, then the load will get its data from matching store(s) in the store queue.

The process of acquiring data from one or more stores that are present in a store queue, through the aforementioned type of address matching, is called Read-After-Write (RAW) forwarding. For a load to obtain data through RAW forwarding, as discussed above, the physical address of the load has to be compared to each of the entries of a store queue. However, as also discussed above, the load carries with it a virtual address and not a physical address. The physical address is obtained after the load's virtual address is translated. Accordingly, a load must wait for its virtual address to be translated to a physical address before the physical address of the load is available to be compared to each of the entries of the store queue.

A shortcoming of conventional cache systems is that a load can not start RAW forwarding, until the aforementioned virtual address to physical address translation process is completed. In particular, RAW forwarding is delayed by the virtual address to physical address translation time. Consequently, the aforementioned conventional systems that feature the above discussed physical address based RAW forwarding, exhibit unsatisfactory RAW forwarding delays due to a virtual address to physical address translation process that can have negative performance implications.

SUMMARY

Some conventional systems that feature physical address based RAW forwarding, exhibit unsatisfactory RAW forwarding delays due to a virtual address to physical address translation process that can have negative performance implications. Methods for read after write forwarding using virtual addressing are disclosed that addresses these shortcomings. However, the claimed embodiments are not limited to implementations that address any or all of the aforementioned shortcomings. As a part of the method, it is determined when a virtual address has been remapped from corresponding to a first physical address to corresponding to a second physical address and if all the stores that occupied a store queue before the remapping have been retired from the store queue. Loads that are younger than the stores that occupied the store queue before the remapping are prevented from being dispatched and executed until the stores that occupied the store queue before the remapping have left the store queue and become globally visible. As a result, "false hits" due to positive virtual address matches that result in the forwarding of incorrect data are avoided.

In another embodiment, as a part of a method for read after write forwarding using virtual addressing it is determined if a load and a store are to a same page. If so, the load is allowed to complete with the data that is acquired via virtual address based forwarding, while the load and store are cross checked against each other (and after they both wait and acquire their physical addresses). If the aforementioned cross checking indicates that the load and the store have different physical addresses the load can be retired. If the aforementioned cross checking indicates that the load and the store have the same physical address the pipeline is flushed such that the load instruction and every instruction subsequent to it is flushed. Accordingly, a functional issue, that can result in a failure of a load to obtain data from a prior store to the same physical address (because the load cannot find a matching virtual address among entries of a store queue), and that can have a deleterious impact on processor performance, is advantageously addressed.

BRIEF DESCRIPTION OF THE DRAWINGS

The invention, together with further advantages thereof, may best be understood by reference to the following description taken in conjunction with the accompanying drawings in which.

It should be noted that like reference numbers refer to like elements in the figures.

DETAILED DESCRIPTION

Figure 1A:
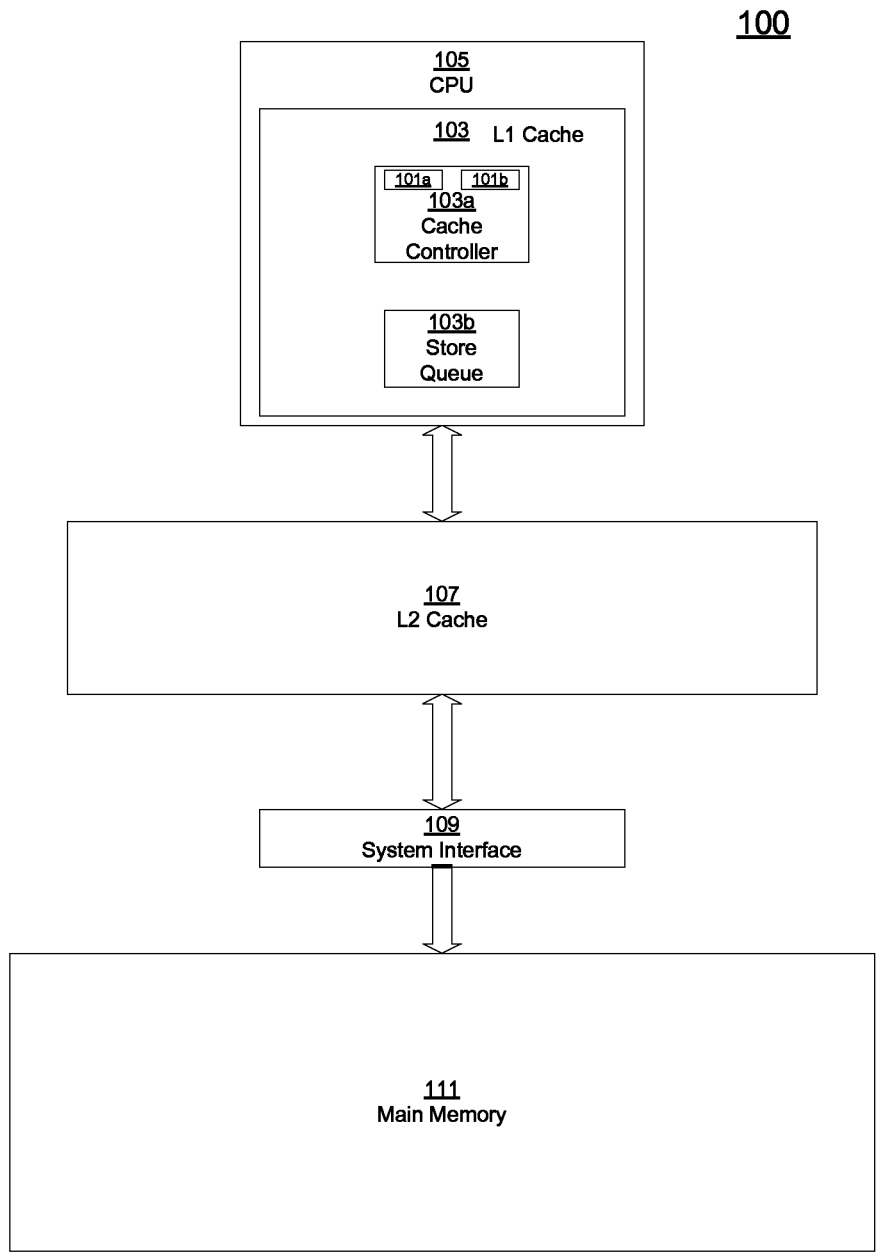
FIG. 1A shows an exemplary operating environment of systems for read after write forwarding using a virtual address according to one embodiment.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "determining" or "enabling" or "waiting" or "comparing" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices. As used herein, the term "globally visible" is intended to refer to the condition that results when a processor executing a store instruction makes store data corresponding to the store instruction available to all other processors and devices that are waiting for the store instruction to finish executing.

Exemplary Operating Environment of Systems and Methods for Faster Read After Write Forwarding Using a Virtual Address According to One Embodiment FIG. 1A shows an exemplary operating environment 100 of systems 101a and 101b for read after write forwarding using a virtual address according to one embodiment. System 101a enables proper read after write forwarding when a load has the same virtual address as a prior store but the physical address of the load and the prior store are different. Accordingly, false virtual address matches that result in the forwarding of incorrect data are avoided. In addition, system 101b enables proper read after write forwarding when a load has a virtual address that is different than an older store, but the load and the store map to the same physical address. Accordingly, a functional issue, that can result in a failure of a load to obtain data from a prior store to the same physical address (because the load cannot find a matching virtual address among entries of a store queue), and that can have a deleterious impact on processor performance, is advantageously addressed. FIG. 1A shows system 101a, system 101b, level one (L1) cache 103, cache controller 103a, store queue 103b, CPU 105, level two (L2) cache 107, system interface 109 and main memory 111.

Referring to FIG. 1A, level one (L1) cache 103 is the primary cache of the processor, and is a data storage component which can be integrated with the CPU 105 core. L1 cache 103 is used to store information recently accessed by CPU 105. In one embodiment, level one (L1) cache 103 can include cache controller 103a and store queue 103b. In one embodiment, when a load is dispatched and a prior store involving data that is sought by the load is still in store queue 103b, the load can obtain the data that it seeks directly from store queue 103b (see discussions provided herein below that describe the operation of systems 101a and 101b that ensures the access of the correct data from store queue 103b as a part of read after write forwarding (RAW)). Level 2 cache 107 is the secondary cache of CPU 105 and like level one (L1) cache 103 is used to store recently accessed information. In the FIG. 1A embodiment, level 2 cache 107 interfaces with the external fabric and is generally accessed for data before main memory 111.

Figure 1B:
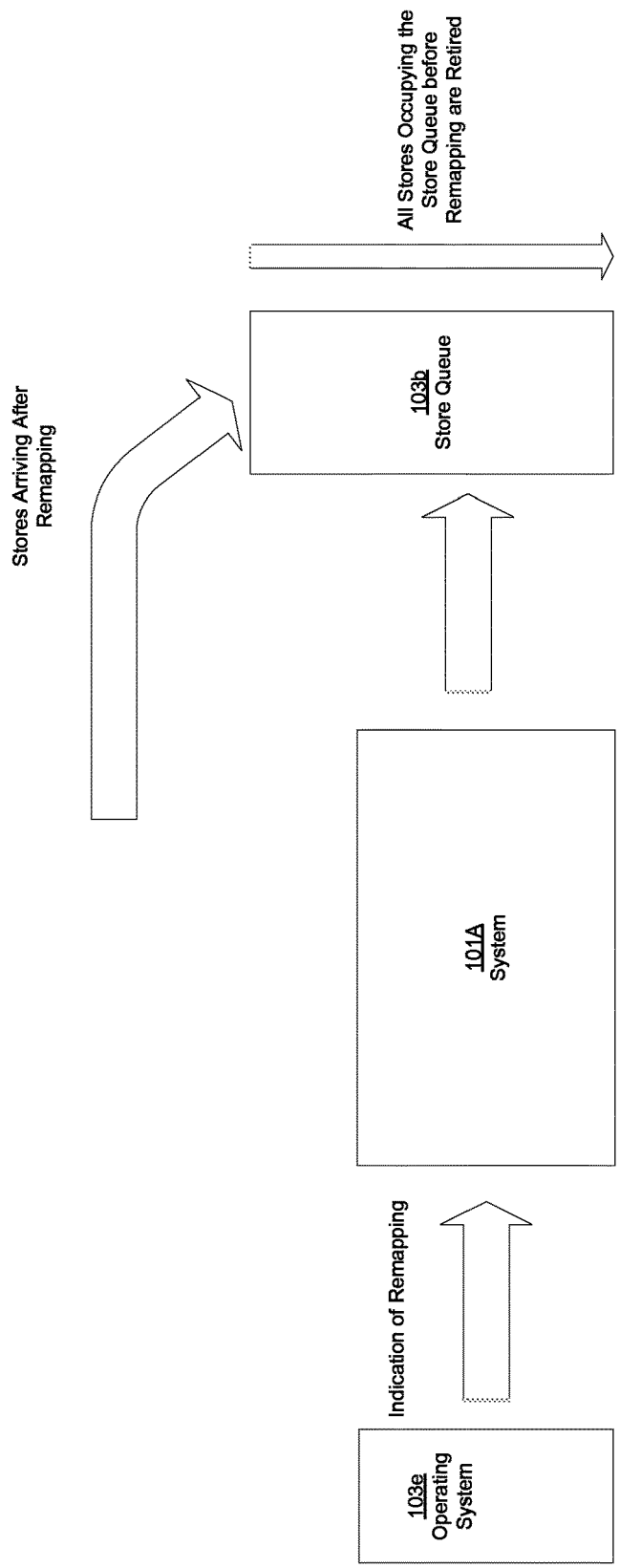
FIG. 1B illustrates the access of an indicator that remapping has occurred from a remapping mechanism according to one embodiment.

System 101a, as discussed above, ensures proper read after write forwarding when a load has the same virtual address as a prior store but the physical addresses of the load and the prior store are different. System 101A, as a part of such operations, identifies a load transaction and determines when a virtual address associated with the load transaction has been remapped from corresponding to a first physical address to a second physical address; determines if all the stores occupying store queue 103b before the remapping have been retired from store queue 103b; and prevents loads that are younger than stores that occupied the store queue 103b before the remapping from being dispatched and executed until the stores that occupied the store queue 103b before the remapping have left the store queue 103b and become globally visible. As a result, a "false hit" due to positive virtual address matches that result in the forwarding of incorrect data are avoided. In one embodiment, system 101a can reside in cache controller 103a. In other embodiments, system 101a can reside in other locations. As shown in FIG. 1B, in one embodiment, as part of its operation, system 101A can access an indicator that remapping has occurred from a remapping component (e.g., operating system 103e) before executing the aforementioned operations (enabling stores that are more recent than stores occupying store queue 103b before the remapping to occupy store queue 103b, etc.).

Figure 1C:
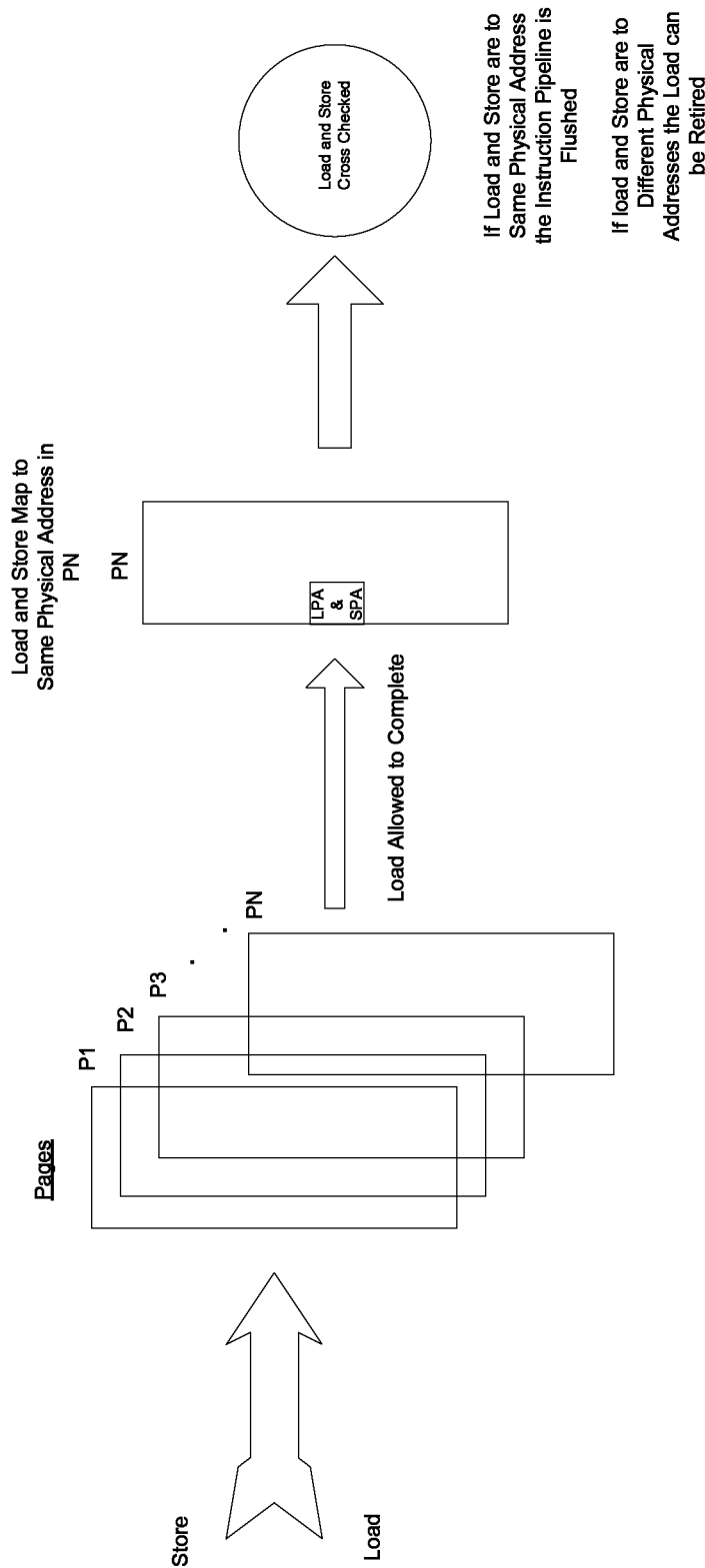
FIG. 1C illustrates operations that are executed when it is determined that a load and a prior store that map to the same physical address are to the same page according to one embodiment.

System 101b, as discussed above, ensures proper read after write forwarding when a load has a virtual address that is different than an older store, but the load and the store map to the same physical address. System 101B, as part of such operations, determines if a load and a prior store that map to the same physical address are to a same page and allows the load to complete with data that it acquired via virtual address based forwarding while the load and store are cross checked against each other (after they both wait and acquire their physical address). If the aforementioned cross checking indicates that the load and the store have different physical addresses the load can be retired. If the aforementioned cross checking indicates that the load and the store have the same physical address the pipeline is flushed such that the load instruction and every instruction subsequent to it is flushed. In one embodiment, system 101b can reside in cache controller 103a. In other embodiments, system 101b can reside in other locations. As is shown in FIG. 1C, when it is determined that a load and a prior store that map to the same physical address are to the same page the aforementioned operations can be executed by system 101B such that the load can be completed with proper read after write ensured.

Referring again to FIG. 1A, main memory 111 includes physical addresses that store information that is copied into L1 cache 103 and L2 cache 107. Also shown in FIG. 1A is system interface 109.

Operation

Figure 1D:
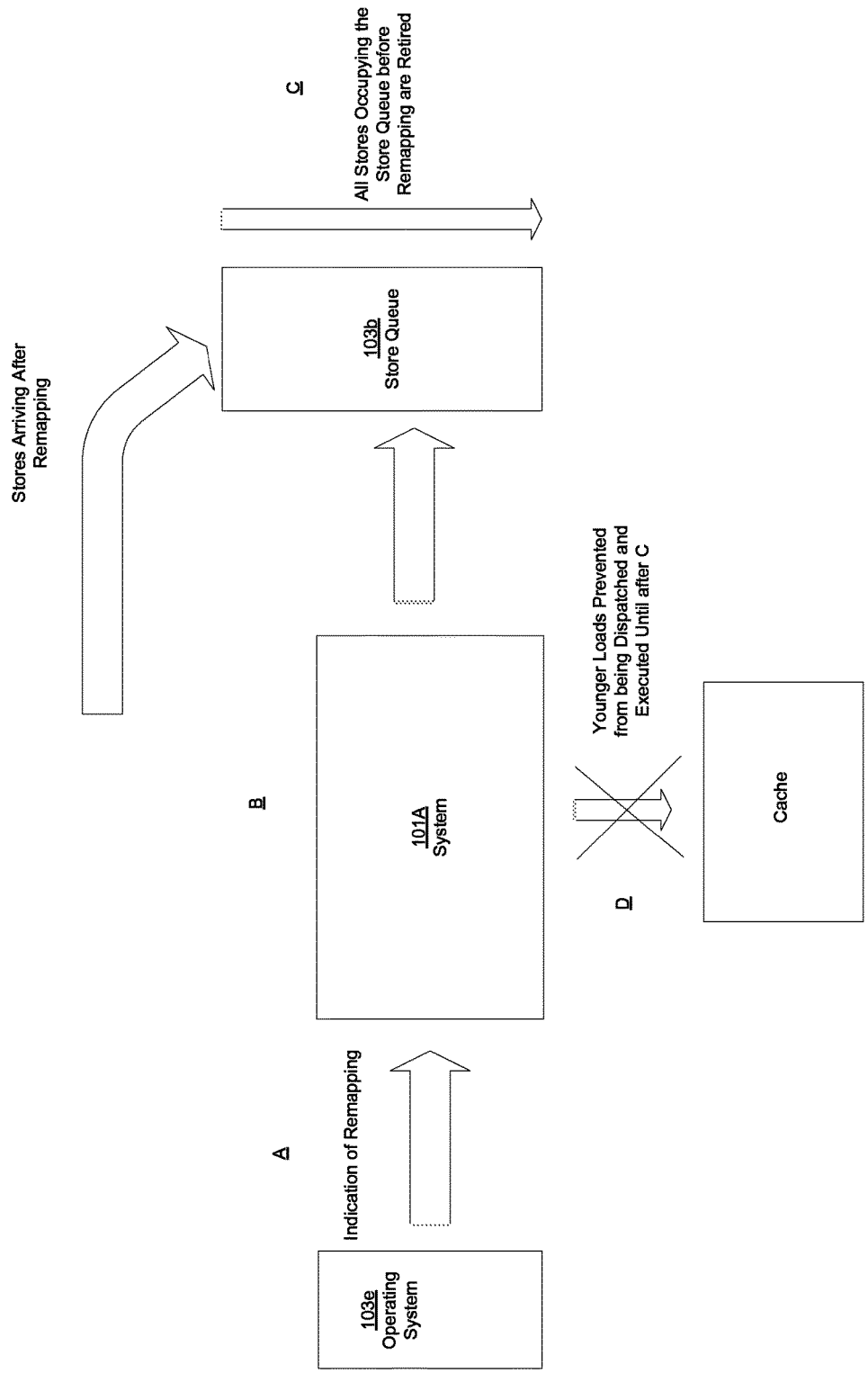
FIG. 1D illustrates operations performed by a system for read after write forwarding using a virtual address according to one embodiment.
Figure 1E:
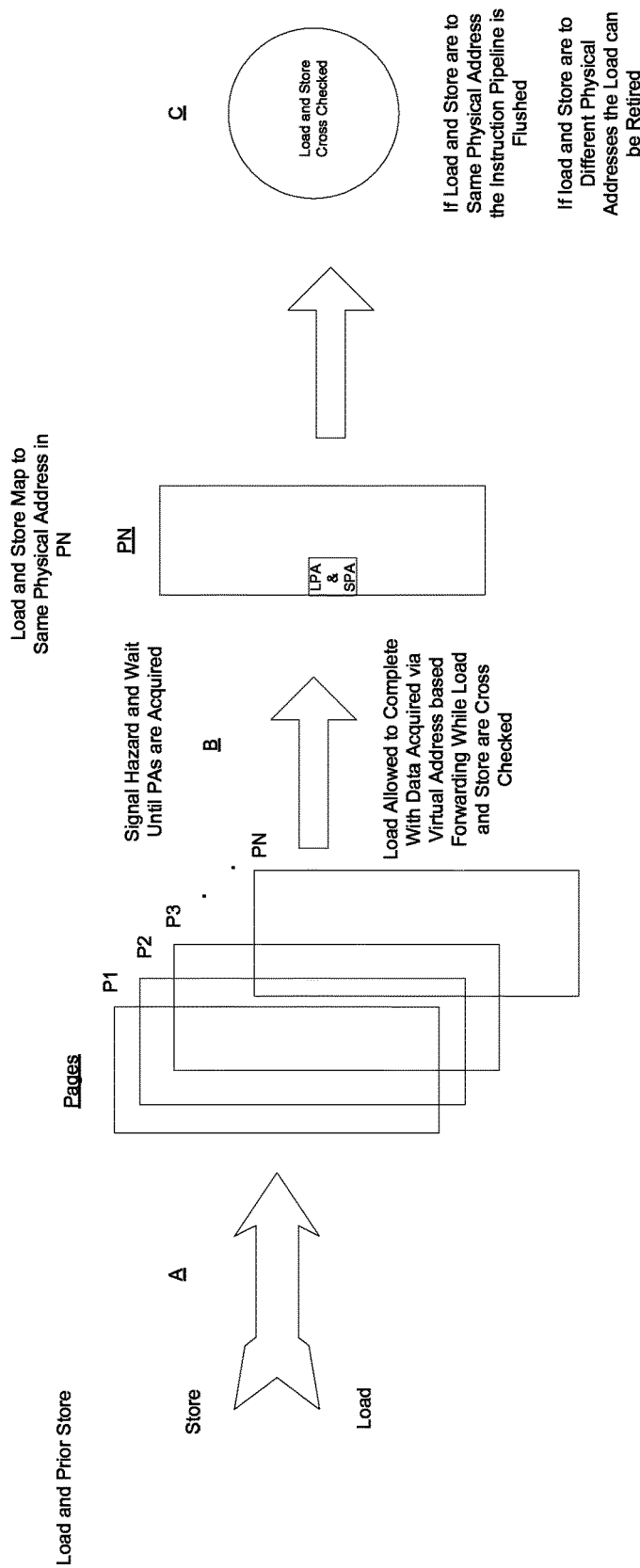
FIG. 1E illustrates operations performed by a system for read after write forwarding using a virtual address according to one embodiment.

FIGS. 1D and 1E illustrate operations performed by systems 101a and 101b for read after write forwarding using a virtual address according to one embodiment. These operations, which relate to read after write forwarding, are only exemplary. It should be appreciated that other operations not illustrated by FIGS. 1D and 1E can be performed in accordance with one embodiment.

As regards system 101a, referring to FIG. 1D, at A, an indicator that remapping has occurred is accessed. In one embodiment, the indicator is provided by a remapping component (e.g., operating system 103e).

At B, it is determined whether a virtual address associated with the load has been remapped from corresponding to a first physical address to a second physical address. In one embodiment, the determination is based on the indicator that is accessed from the remapping component.

At C, it is determined if all the stores that occupied store queue 103b before remapping have been retired from store queue 103b.

At D, if all the stores that occupied store queue 103b before remapping have been retired from store queue 103b, loads that are younger than stores that occupied the store queue 103b before the remapping are prevented from being dispatched and executed until the stores that occupied the store queue 103b before the remapping have left the store queue 103b and become globally visible. As a result, a "false hit" due to positive virtual address matches that result in the forwarding of incorrect data are avoided.

As regards system 101b, referring to FIG. 1E, at A, it is determined if a load and a prior store that map to the same physical address are to a same page.

At B, if it is determined that the load and the store are to the same page, a hazard is signaled, and the load is allowed to complete (but not to be retired) with the data that it acquired via virtual address based forwarding while the load and store are cross checked against each other at C (and after they both wait and acquire their physical address). If the aforementioned cross checking indicates that the load and the store have different physical addresses the load can be retired. If the aforementioned cross checking indicates that the same physical address is involved the pipeline is flushed such that the load instruction and every instruction subsequent to it is flushed.

Figure 2:
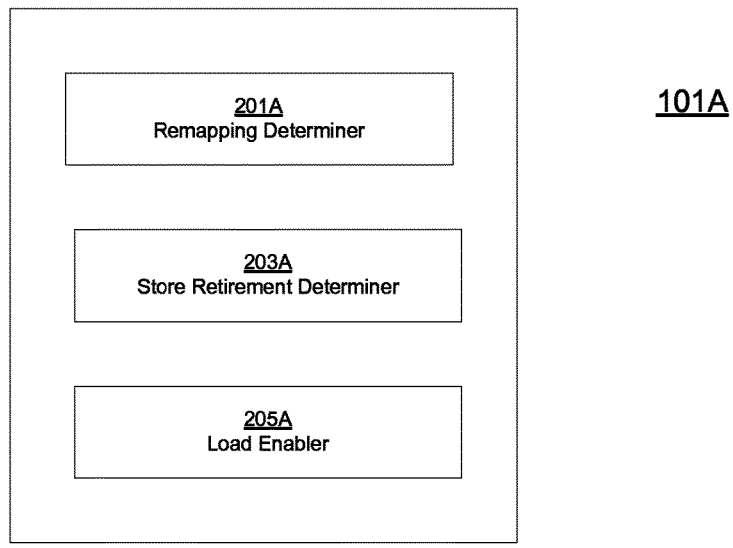
FIG. 2 shows components of a system for read after write forwarding using a virtual address according to one embodiment.
Figure 2:
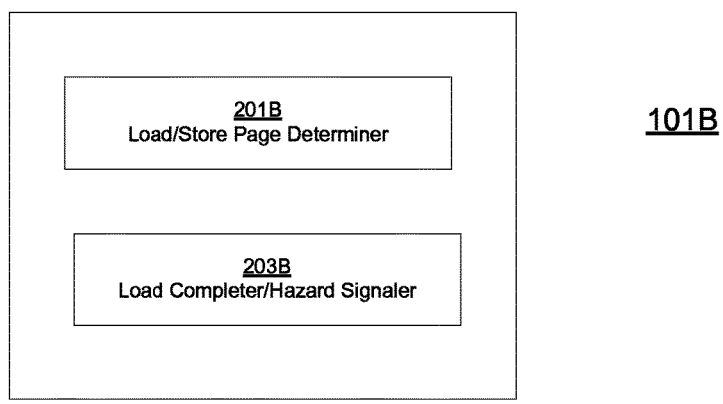

Components of System for Systems and Methods
for Faster Read After Write Forwarding Using a
Virtual Address According to One Embodiment FIG. 2 shows components of system 101A and system 101B for read after write forwarding using a virtual address according to one embodiment. In one embodiment, components of system 101A and system 101B implement an algorithm for read after write forwarding using a virtual address. In the FIG. 2 embodiment, components of system 101A include remapping determiner 201A, store retirement determiner 203A and load enabler 205A. Moreover, in the FIG. 2 embodiment, components of system 101B include load/store page determiner 201B and load completer/hazard signaler 203B.

Referring to FIG. 2, as regards system 101A, remapping determiner 201A determines when a virtual address of a load has been remapped from corresponding to a first physical address to a second physical address. In one embodiment, remapping determiner can receive an indicator that remapping has been completed from a remapping component.

Store retirement determiner 203A determines if all the stores that occupied a store queue before the remapping have been retired from the store queue.

Load enabler 205A prevents loads that are younger than stores that occupied the store queue (e.g., 103b in FIG. 1A) before the remapping from being dispatched and executed until the stores that occupied the store queue before the remapping have left the store queue and become globally visible. As a result, a "false hit" due to positive virtual address matches that result in the forwarding of incorrect data are avoided. Accordingly, in one embodiment, when the virtual address of a younger load is compared to addresses in the store queue, none of the prior stores will remain in the store queue (and thus false address matches are obviated).

Referring to FIG. 2, as regards system 101B, load/store page determiner 201B determines if a load and a store are to the same page. In one embodiment, load/store page determiner 201B determines if a load and a store are to the same 4 k page. In other embodiments, load/store page determiner 201B determines if a load and a store are to another sized page.

Load completer/hazard signaler 203B signals a hazard and allows the load to complete with data that is acquired via virtual address based forwarding while the load and store are cross checked against each other (after they both wait and acquire their physical address). If the aforementioned cross checking indicates that the load and the store have different physical addresses the load can be retired. If the aforementioned cross checking indicates that the load and the store have the same physical address the pipeline is flushed such that the load instruction and every instruction subsequent to it is flushed. Accordingly, proper read after write forwarding is enabled when the load has a virtual address that is different than an older store, but the load and the store map to the same physical address.

It should be appreciated that the aforementioned components of system 101 can be implemented in hardware or software or in a combination of both. In one embodiment, components and operations of system 101 can be encompassed by components and operations of one or more computer components or programs (e.g., a cache controller 103a). In another embodiment, components and operations of system 101 can be separate from the aforementioned one or more computer components or programs but can operate cooperatively with components and operations thereof.

Figure 3:
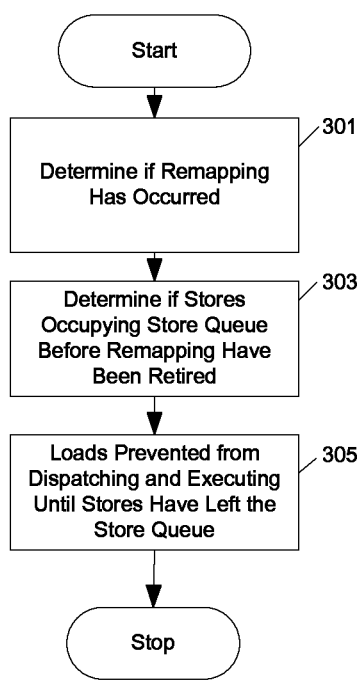
FIG. 3 shows a flowchart of the steps performed in a method for read after write forwarding using a virtual address according to one embodiment according to one embodiment.
Figure 4:
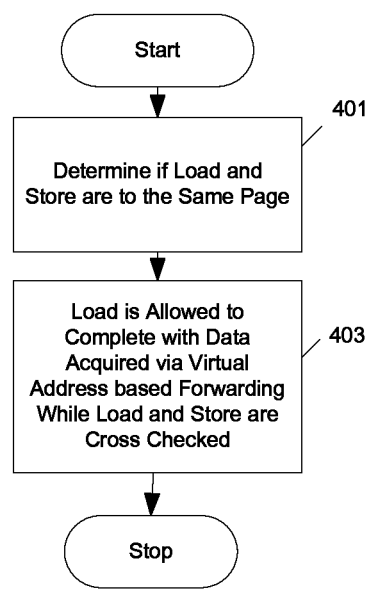
FIG. 4 shows a flowchart of the steps performed in a method for read after write forwarding using a virtual address according to one embodiment according to one embodiment.

Method for Faster Read After Write Forwarding Using a Virtual Address According to One Embodiment FIGS. 3 and 4 shows flowcharts 300 and 400 of the steps performed for read after write forwarding using a virtual address according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 301, it is determined if a virtual address associated with a load has been remapped from corresponding to a first physical address to corresponding to a second physical address.

At 303, it is determined if all the stores occupying a store queue before the remapping have been retired from the store queue.

At 305, if all stores occupying the store queue before the remapping have been retired from the store queue, loads that are younger than stores that occupied the store queue before the remapping are prevented from being dispatched and executed until the stores that occupied the store queue before the remapping have left the store queue and become globally visible. As a result, a "false hit" due to positive virtual address matches that result in the forwarding of incorrect data are avoided.

Referring to FIG. 4, at 401, it is determined if a load and a prior store that map to the same physical address are to a same page.

At 403, if the load and the store are to the same page a hazard is signaled and the load is allowed to complete with data that is acquired via virtual address based forwarding while the load and store are cross checked against each other (after they both wait and acquire their physical address) the aforementioned cross checking indicates that the load and the store have different physical addresses the load can be retired. If the aforementioned cross checking indicates that the load and the store have the same physical address the pipeline is flushed such that the load instruction and every instruction subsequent to it is flushed.

With regard to exemplary embodiments thereof, systems and methods for read after write forwarding using a virtual address are disclosed. A method includes determining when a virtual address has been remapped from corresponding to a first physical address to a second physical address and determining if all stores occupying a store queue before the remapping have been retired from the store queue. Loads that are younger than the stores that occupied the store queue before the remapping are prevented from being dispatched and executed until the stores that occupied the store queue before the remapping have left the store queue and become globally visible.

Although many of the components and processes are described above in the singular for convenience, it will be appreciated by one of skill in the art that multiple components and repeated processes can also be used to practice the techniques of the present invention. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

We claim:

1. A method for performing read after write forwarding in a processor, the method comprising:
   determining that a virtual address associated with a load instruction has been remapped from a first physical address to a second physical address; and
   delaying the load instruction from executing until all store instructions in a store queue that are older than the remapping of the virtual address from the first physical address to the second physical address have retired.

2. The method of claim 1, further comprising:
   determining that all store instructions in the store queue that are older than the remapping of the virtual address from the first physical address to the second physical address have retired; and
   executing the load instruction in response to determining all store instructions in the store queue that are older than the remapping of the virtual address from the first physical address to the second physical address have retired.

3. The method of claim 1, further comprising:
   determining that the virtual address of the load instruction is the same as a store instruction in the store queue,
   wherein delaying the execution of the load instruction is performed in response to determining that the virtual address of the load instruction is the same as the store instruction in the store queue.

4. The method of claim 3, wherein the second physical address is different from a physical address of the store instruction.

5. The method of claim 1, wherein determining that the virtual address associated with the load instruction has been remapped from the first physical address to the second physical address is based on an indicator provided by an operating system.

6. The method of claim 1, wherein upon a store instruction being retired, the store instruction is globally visible in the processor.

7. The method of claim 1, wherein the method is performed by a cache controller of a cache of the processor.

8. A processor for performing read after write forwarding, the processor comprising:
a remapping determiner to determine that a virtual address associated with a load instruction has been remapped from a first physical address to a second physical address; and
a load enabler to delay the load instruction from executing until all store instructions in a store queue that are older than the remapping of the virtual address from the first physical address to the second physical address have retired.

9. The processor of claim 8, further comprising:
a store retirement determiner to determine that all store instructions in the store queue that are older than the remapping of the virtual address from the first physical address to the second physical address have retired such that the load instruction is executed only after determining all store instructions in the store queue that are older than the remapping of the virtual address from the first physical address to the second physical address have retired.

10. The processor of claim 8, wherein the virtual address of the load instruction is the same as a store instruction in the store queue, and
wherein the load enabler delays the execution of the load instruction in response to determining that the virtual address of the load instruction is the same as the store instruction in the store queue.

11. The processor of claim 10, wherein the second physical address is different from a physical address of the store instruction.

12. The processor of claim 8, wherein the remapping determiner determines that the virtual address associated with the load instruction has been remapped from the first physical address to the second physical address is based on an indicator provided by an operating system.

13. The processor of claim 8, wherein upon a store instruction being retired, the store instruction is globally visible in the processor.

14. A non-transitory machine-readable medium storing instruction that when executed by a processor, cause the processor to:
determine that a virtual address associated with a load instruction has been remapped from a first physical address to a second physical address; and
delay the load instruction from executing until all store instructions in a store queue that are older than the remapping of the virtual address from the first physical address to the second physical address have retired.

15. The non-transitory machine-readable medium of claim 14, wherein the instructions when executed by the processor further cause the processor to:
determine that all store instructions in the store queue that are older than the remapping of the virtual address from the first physical address to the second physical address have retired; and
execute the load instruction in response to determining all store instructions in the store queue that are older than the remapping of the virtual address from the first physical address to the second physical address have retired.

16. The non-transitory machine-readable medium of claim 14, wherein the instructions when executed by the processor further cause the processor to:
determine that the virtual address of the load instruction is the same as a store instruction in the store queue,
wherein delaying the execution of the load instruction is performed in response to determining that the virtual address of the load instruction is the same as the store instruction in the store queue.

17. The non-transitory machine-readable medium of claim 16, wherein the second physical address is different from a physical address of the store instruction.

18. The non-transitory machine-readable medium of claim 14, wherein determining that the virtual address associated with the load instruction has been remapped from the first physical address to the second physical address is based on an indicator provided by an operating system.

19. The non-transitory machine-readable medium of claim 14, wherein upon a store instruction.

* * * * *